(12) United States Patent
Kremers et al.

(10) Patent No.: US 7,073,926 B1
(45) Date of Patent: Jul. 11, 2006

(54) ADJUSTABLE OVERHEAD TROUBLE LIGHT STAND

(76) Inventors: Bernard J. Kremers, 5168 50th St., Swanville, Morrison, MN (US) 56382; Cynthia M. Kremers, 5168 50th St., Swanville, Morrison, MN (US) 56382

( * ) Notice: Subject to any disclaimer, the term of this patent is extended or adjusted under 35 U.S.C. 154(b) by 95 days.

(21) Appl. No.: 10/879,921

(22) Filed: Jun. 28, 2004

Related U.S. Application Data

(60) Provisional application No. 60/484,415, filed on Jun. 30, 2003.

(51) Int. Cl.
*F21S 8/08* (2006.01)

(52) U.S. Cl. ............... 362/419; 362/287; 362/382; 362/413; 362/427; 248/123.2

(58) Field of Classification Search ............ 248/123.2; 362/382, 287, 413, 427, 419
See application file for complete search history.

(56) References Cited

U.S. PATENT DOCUMENTS

| | | | |
|---|---|---|---|
| 1,729,395 A | | 9/1929 | Mandel |
| 2,479,720 A | * | 8/1949 | Brandt ............... 248/123.2 |
| 3,783,262 A | * | 1/1974 | Pile ............... 362/184 |
| 4,321,660 A | * | 3/1982 | Sokol ............... 362/368 |
| 5,060,894 A | | 10/1991 | Hillinger |
| 5,236,160 A | * | 8/1993 | Sechelski ............... 248/125.1 |
| 5,449,138 A | * | 9/1995 | Ciancio ............... 248/123.2 |
| 5,964,524 A | | 10/1999 | Qian |
| 6,416,207 B1 | | 7/2002 | Chang |
| 6,474,844 B1 | | 11/2002 | Ching |

* cited by examiner

*Primary Examiner*—Alan Cariaso
*Assistant Examiner*—James W Cranson, Jr.
(74) *Attorney, Agent, or Firm*—Albert W. Watkins

(57) ABSTRACT

A stand-supported light source includes a combination of collapsing, telescopic and flexible joint couplings. For storage and shipping, a plurality of legs are collapsible to become longitudinally parallel to the longitudinal axis of the base. A telescopic arm coupled to the stand may also be pivoted into a longitudinally parallel axis and then telescopically retracted, which results in a very compact configuration. In use, the telescopic arm may be extended through a range of positions, and may pivot out of parallel with the stand base longitudinal axis, permitting the light source to be located through a wide and precisely controlled range of motion. The legs are pivoted and self locking at a limited range of motion, simplifying set-up. A special clamp accepts a standard trouble light, without inhibiting access to or use of the various electrical switches and outlets that might typically be found on the trouble light. Different embodiments detail the pivot, clamp and various combinations.

17 Claims, 3 Drawing Sheets

US 7,073,926 B1

ADJUSTABLE OVERHEAD TROUBLE LIGHT STAND

CROSS REFERENCE TO RELATED APPLICATIONS

This application claims priority to U.S. provisional application Ser. No. 60/484,415 filed Jun. 30, 2003 of common title and inventorship, the contents which are incorporated herein by reference in entirety.

BACKGROUND OF THE INVENTION

1. Field of the Invention

This invention pertains generally to the field of illumination, and more particularly to a trouble light stand which may be configured for overhead or underneath illumination from a virtually unlimited number of angles and with diverse work objects by simple manipulation of a few mechanical connectors.

2. Description of the Related Art

Human beings are capable of using the human intellect to make an amazing number of decisions and perform an equally amazing number of actions in very short time periods. Regardless of the decision or activity, the human intellect is dependent upon sensory information received through the five senses of sight, hearing, sound, touch, taste, and smell. When this sensory information provides clear distinctions to the person's mind, a person will be able to make decisions and perform actions much more reliably and quickly than when the sensory information is muddled.

Research has demonstrated that most humans rely most heavily upon sight for the gathering of information. For example, while blind persons regularly navigate based upon touch, sound, hearing and even smell, most sighted individuals rely almost entirely upon sight. Consequently, for the effective and efficient performance of many tasks and activities, sight is extremely important to an individual. Insufficient illumination has been demonstrated through much research to result in errors of judgment, accidents, and loss of efficiency.

In order for visual information to be gathered effectively, there must be sufficient illumination and adequate contrast for a person to reliably and speedily discern objects. This in turn requires adequate illumination within the area of visual interest. As a result, many different lighting arrangements and fixtures have been developed over time which are intended to provide a desired level of illumination. Common illumination systems include various overhead and spot lighting systems. While these methods of illumination provide suitable lighting for objects which are in direct line with such light sources, any objects not in direct illumination path may receive inadequate light for accurate sensory information to be gained in minimal time. Consequently, objects which are shadowed, such as may be found in fight places or in complex geometrical structures of machines or other such constructions, overhead or spot lighting is generally inadequate. In more complex locations, even intense lighting such as daylight may be inadequate, since other objects may block enough light to prevent a persons from discerning shapes and objects quickly and efficiently.

Consequently, man has devised alternative lighting systems to augment or replace more general lighting systems. One such system is the well known trouble light that may or may not be extended from a drop line, and which typically includes an extension cord, handle, electric power switch, incandescent bulb, protective cage about the bulb, hanger, and in some cases an electrical outlet. The hanger is provided to permit the light to be suspended from any suitable object in or adjacent the region of interest, while readily permitting a person to move the light source to other locations which may subsequently be of interest. More recently, other types of electric bulbs have been developed which have also been used in similar application, including fluorescent and halogen bulbs, but the hanger continues to be the most prevalent method of support in the field.

Unfortunately, there are many environments and tasks where the hanging light may not be adequately positioned to produce the appropriate light, shadowing and contrast desired. One common environment where this is a problem is in the assembly or repair of large and complex machines, such as automobile power trains. The automobile body will almost always block any light from directly reaching any of the power train components. Yet the space is very limited, and in some instances the components such as engine or exhaust manifold may be very hot and hazardous. Consequently, with insufficient light, a mechanic may easily accidentally touch a searing hot component, or may poorly grasp and consequently drop a component. The common hanger will illuminate some of the components, but there are many instances where a hanger is not available at the right position or the direction of illumination when the light is hung from a nearby hanger is inadequate.

SUMMARY OF THE INVENTION

In a first manifestation, the invention is an extensible and collapsible stand in combination with and supporting a light source. A base provides mechanical support upon a surface. A column rises from the collapsible base. A boom arm is coupled through a pivotal joint to the column, and is clamped to a light source having a handle, light bulb, and electrical cord. The clamp coupling light source to boom arm has top and bottom members of a generally u-shaped cross-section operatively drawn together by a force applicator about the light source handle and additionally has means for attachment to the boom arm.

In a second manifestation, the invention is a clamp affixing a light source to a supporting stand, comprising top and bottom members of a generally u-shaped cross-section operatively forced together by a force applicator about the light source handle and additionally having a means for attachment to the boom arm.

In a third manifestation, the invention is an adjustable trouble light stand for supporting an illumination source above a surface and at various locations relative to a work piece resting upon the surface. A collapsible base has at least three fixed u-shaped brackets, each which are closed from the top and both sides but open from the bottom, at least three legs arranged with each one of the at least three legs extending from and pivotally attached to a corresponding one of the u-shaped brackets to permit movement legs distal to brackets, and surface contacting pads pivotally attached and terminating each of the legs adjacent ends distal to brackets, the ends of the legs pivotal away from the surface to a degree limited by mechanical interference between legs and closed bracket tops. A telescopically extensible vertical standard rises from collapsible base and has a first longitudinally extensive standard member and a second co-axial extensible standard member that define a longitudinal axis of the telescopically extensible vertical standard. A fastener controllably fixes the second extensible standard member to the first longitudinally extensive standard member. A telescopically extensible arm has a first longitudinally extensive member and a second member extensible with respect to the first member, and a hand fastener controllably fixing a relative position between the first longitudinally extensive member and the second member. A pivotal joint couples the telescopically extensible vertical standard to the telescopically extensible arm and has a plate rigidly affixed to the longitudinally extensive member with a plurality of holes that follow an arc having a center of radius at a pivot between the telescopically extensible vertical standard and the telescopically extensible arm. The joint also has a position setting pin suitable for extending through at least one of the plurality of holes and simultaneously passing through openings in a pair of spaced members which extend from the arm first longitudinally extensive member. A hole is provided in the second extensible standard member which follows the arc of holes and permits the position setting pin to pass there through while passing through the openings in the pair of spaced members, thereby locating said telescopically extensible arm co-axially with the second extensible standard member. A light source is additionally included, and has a handle, electric power switch, light bulb, and electrical cord. Finally, a clamp couples the light source to the telescopically extensible arm and has top and bottom clamshell members of a generally u-shaped cross-section forced together by a pair of hand screws. The top and bottom clamshell members open in middle portions most adjacent to the pair of hand screws and provide manual access to the electric power switch. The top and bottom clamshell members are operatively clamped together about the light source handle by forces generated by the hand screws.

OBJECTS OF THE INVENTION

Exemplary embodiments of the present invention solve inadequacies of the prior art by providing a stand-supported light source which includes a combination of collapsing, telescopic and flexible joint couplings. For storage and shipping, a plurality of legs are collapsible to longitudinally parallel to the longitudinal axis of the base. Similarly, a telescopic arm is pivoted into a longitudinally parallel axis, and then telescopically retracted. In use, the telescopic arm may be extended through a range of positions, and pivoted out of parallel with the stand base longitudinal axis. The legs are pivoted and self locking at a limited range of motion, simplifying set-up. A special clamp accepts a standard trouble light, without inhibiting access to or use of the various electrical switches and outlets that might typically be found thereon.

A first object of the present invention is to enable a person to position the light source at substantially any position and angle, including components providing both rectilinear and radial adjustment from a ground level illumination to a substantial height. A second object of the invention is to provide a stand which is readily adaptable to a wide variety of light sources, and which does not block or interfere with features or components available thereon. Another object of the present invention is to enable the stand to be collapsed for compact storage and transport, while providing safe and stable use. A further object of the invention is to utilize common components, to minimize manufacturing cost and complexity. Yet another object of the present invention is to provide an adaptable and readily used light stand which can provide adequate reach and positioning for even the most difficult of locations.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
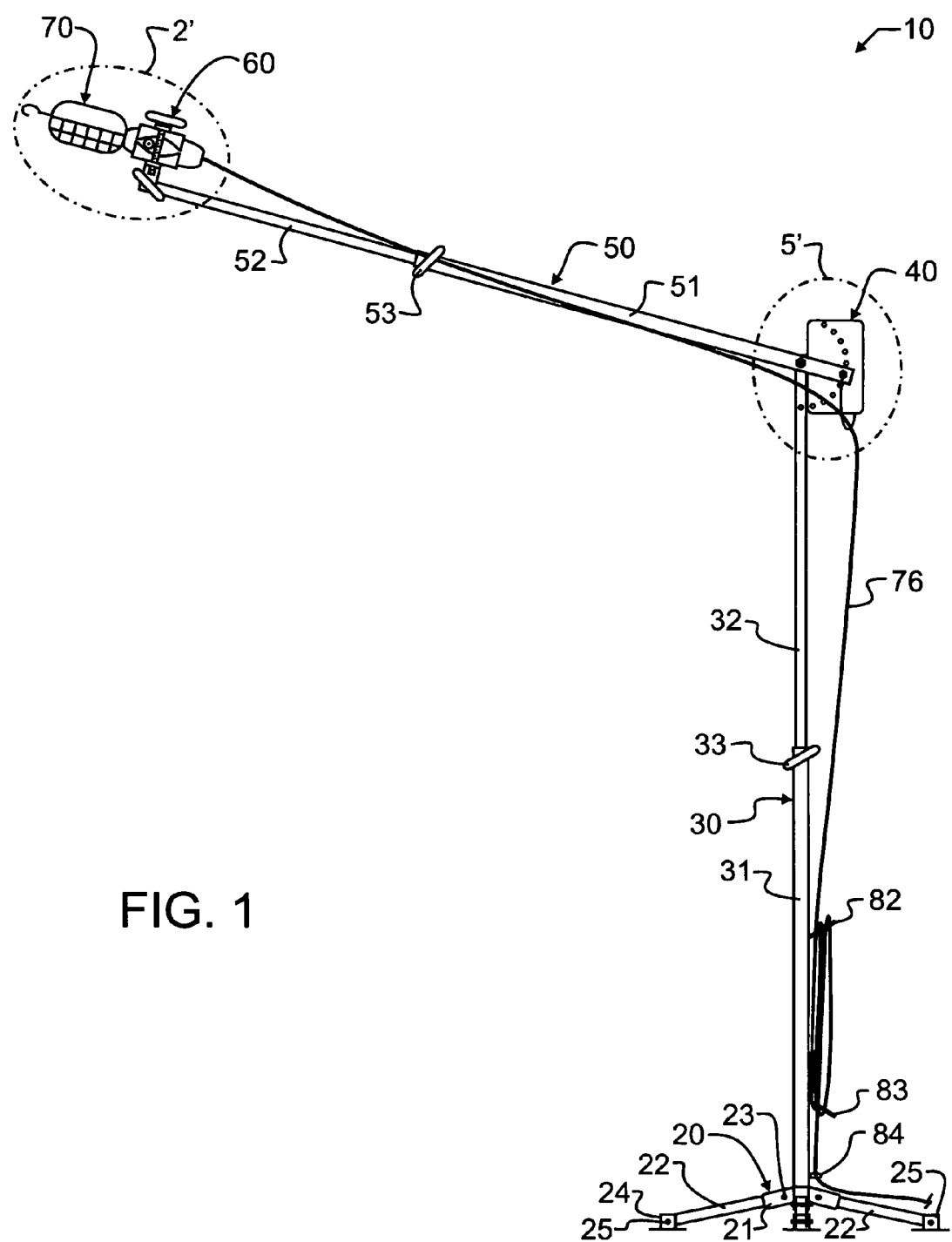
FIG. 1 illustrates a preferred embodiment combination light stand and source designed in accord with the teachings of the present invention from side plan view.

Manifested in the preferred embodiment stand-supported light source 10, the present invention combines collapsing, telescopic, pivotal and flexible joint couplings into a stand suitable for supporting diverse light sources. As illustrated generally in FIG. 1, preferred embodiment stand-supported light source 10 is comprised by seven major components, including collapsible base 20, telescopically extensible vertical standard 30, pivotal joint 40, telescopically extensible arm 50, clamp 60, light source 70, and electric cord supports 81–83. Ordinary components commonly used will be recognized and understood to be contemplated herein, for exemplary purposes but not limited thereto including such devices as washers of steel, polytetrafluoroethylene, polyethylene, polypropylene, nylon or the like. The use and selection of such ordinary components will be understood to be incorporated herein without specific discussion thereto.

Collapsible base 20 most preferably includes at least three, but potentially as many more fixed u-shaped brackets 21 as may be desired, each which are closed from the top and both sides, but open from the bottom most nearly adjacent the surface upon which preferred embodiment stand-supported light source 10 stands. One leg 22 extends from each bracket 21, and is pivotally attached thereto through a single bolt and lock nut combination or other suitable fastener 23. Since brackets 21 are u-shaped and open downward, legs 22 may pivot freely by moving the end of legs 22 distal to brackets 21 downward. This motion in the preferred embodiment will occur simply by lifting standard 30 vertically, though tolerances may be controlled or frictional washers or couplings provided which would instead require manipulative forces to so induce the motion. When so pivoted, legs 22 will be aligned along an axis parallel to the axis of standard 30, which is beneficial for storage by reducing the floor space required or consumed when preferred embodiment stand-supported light source 10 is not in use.

When legs 22 are to be extended, which will permit base 20 to support the balance of preferred embodiment stand-supported light source 10, the weight of vertical standard 30 and the components supported thereon will cause the ends of legs 22 most distal to brackets 21 to pivot upwards, but this motion will be limited when each leg 22 interferes with the closed top of the associated bracket 21. Most preferably, individual pads 24 will be provided at the ends of each leg 22, and will preferably be attached thereto through a pivotal joint or coupling 25, which may, in the preferred embodiment, simply comprise a bolt and lock nut combination or other suitable fastener which will permit pad 24 to pivot and thereby rest parallel to the part of a supporting surface most nearly adjacent pad 24. Consequently, even with an irregular surface, pads 24 will rest securely thereon, and will also provide somewhat more contact surface area than would be achieved from the simple end of legs 22.

It will be apparent herein that pads 24 may be provided with any type of suitable contact material which may be suitable for a given application. For automotive shop use, the materials will most preferably be reasonably non-slip, but must also be oil, grease, solvent and cleaner resistant, and so may simply be carbon steel. However, a multitude of other materials may be used, including but not limited to elastomeric or rigid polymers, or other natural or synthetic materials, the particular selection which will be based upon the intended range of applications.

While legs 22 are designed in the preferred embodiment for motion downwards, it is also contemplated herein to provide motion permitting legs 22 to be folded so that the ends distal to brackets 21 will pivot upwards to a position adjacent to and parallel with standard 30. However, to effect this motion and still enable legs 22 to support standard 30 in a reasonably vertical orientation, an additional fastener or affixing mechanism would be required, such as a separate pin, detent or locking mechanism, the nature of which will be selected from the myriad of such devices known in the general hardware industry. Nevertheless, such methods of coupling are believed herein to add undesirable complexity and expense, and consequently are not the most preferred. Instead, such alternatives would be available when other circumstances warrant, such as when final compacted storage length of a preferred embodiment stand-supported light source 10 is deemed to be critical and necessary to minimize.

Telescopically extensible vertical standard 30 rises generally vertically from base 20, and includes a bottom tube 31, a smaller extensible tube 32 which slides coaxially within bottom tube 31 and is co-axial therewith to define a vertical longitudinal axis of standard 30. Relative positioning between bottom tube 31 and extensible tube 32 is maintained by hand fastener 33, which may be a thumb screw, threaded t-bar, quick release clamp, or any other suitable coupling or fastener which may be used to controllably fix extensible tube 32 to bottom tube 31. While bottom tube 31 and extensible tube 32 are in the preferred embodiment fabricated from square tubing, it will be recognized by those skilled in the art that these tubes 31, 32 may in fact be fabricated alternatively from other materials and geometries, and need not comprise tubing at all. Since cylinder and rod combinations and other geometries are known which may be used to fulfill the telescopic function described herein, these geometries will be understood to be contemplated in the present disclosure. Consequently, tubes 31, 32 will be understood to be longitudinally extensive members of any geometry which perform the telescopic function along this longitudinal axis as desired and described in the preferred embodiment.

A telescopically extensible arm 50 in the preferred embodiment is of construction similar to standard 30, including outer tube 51, inner extensible tube 52, and hand fastener 53 controllably fixing the position of extensible tube 52 relative to outer tube 51. Once again, tubes 51 and 52 will be understood to be longitudinally extensive members that may assume other geometries when implemented in an actual product. Telescopically extensible arm 50 is coupled to standard 30 through pivotal joint 40, the details of which will be discussed herein below with reference to FIGS. 5 and 6. At the end of telescopically extensible arm 50 distal to standard 30 is clamp 60, which in turn supports light source 70.

Figure 2:
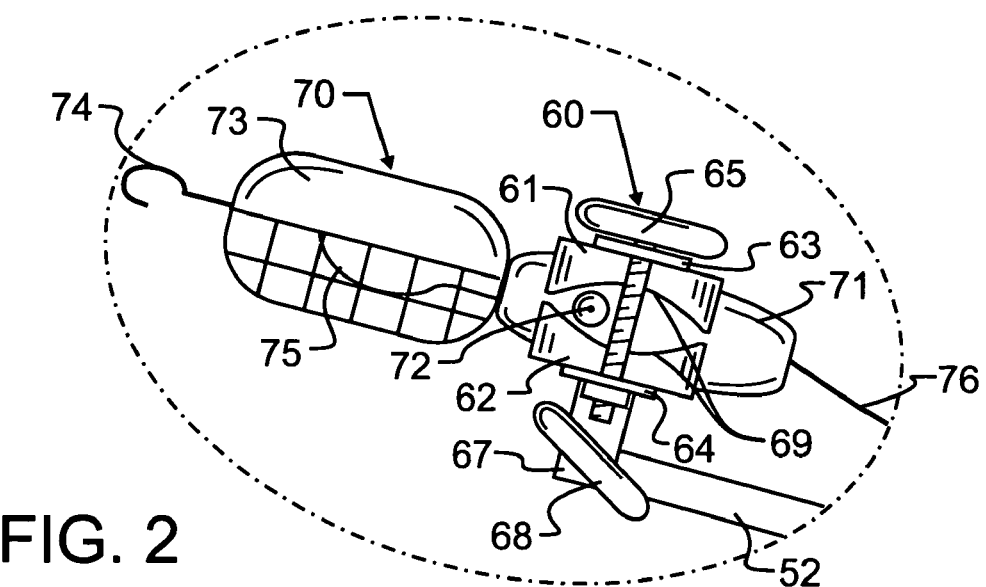
FIG. 2 illustrates the preferred light clamp and light source illustrated in FIG. 1 by magnified section view taken along line 2' of FIG. 1.
Figure 3:
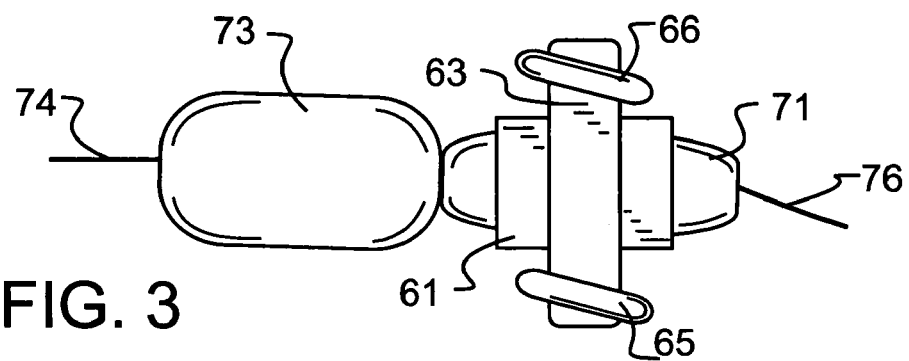
FIG. 3 illustrates the preferred light clamp and light source of FIG. 2 from top plan view.
Figure 4:
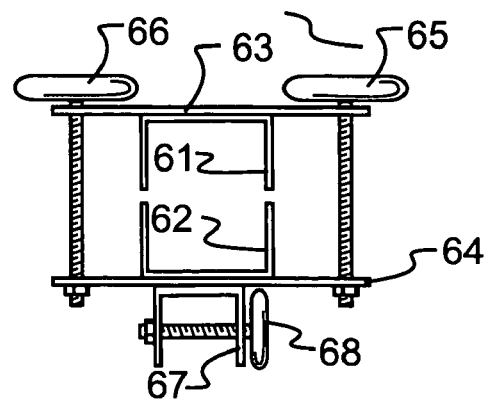
FIG. 4 illustrates the preferred light clamp of FIG. 2 by from end plan view with the light source removed therefrom.

With reference to FIGS. 2–4, clamp 60 will preferably be designed to accommodate a variety of light sources obtained from various manufacturers. In the preferred embodiment stand-supported light source 10 shown in FIGS. 1–3, light source 70 is a traditional trouble light having a handle 71, electric power switch 72, protective cage 73, hanger 74, incandescent bulb 75, and electrical cord 76. It will be understood however, that, as discussed herein above, a variety of light sources have been developed for use in settings where the preferred embodiment stand-supported light source 10 might be used, and most preferably such light sources will desirably be generally interchangeable with light source 70, either directly using existing clamp 60 or a clamp of similar function to clamp 60 but with alternative geometry applicable to a different light source geometry. Nevertheless, the preferred clamp 60 illustrated in FIGS. 2–4 offers much novelty independent of the remainder of preferred embodiment stand-supported light source 10. Clamp 60 includes top and bottom clamshell members 61, 62 which as seen in FIG. 4 have a generally u-shaped cross-section, but which open in the middle portions 69 most adjacent to hand screws 65, 66. This open region 69 is provided adjacent to and to accommodate electric power switch 72 and other features such as electrical outlets, while still providing manual access thereto. Clamshell members 61, 62 are operatively clamped together, and consequently about handle 71, by a combination of plates 63, 64 and forces generated there against by hand screws 65, 66. In the preferred embodiment, plate 63 is welded to clamshell member 61, and plate 64 is welded to clamshell member 62, but it will be recognized that a myriad of fastening techniques may be utilized. It is nevertheless preferred that the clamshell members 61, 62 be affixed to plates 63, 64 in some suitable manner, so that clamshell members 61, 62 do not accidentally separate therefrom when light source 70 has been removed. Clamp 60 additionally includes a means for attachment to telescopic arm 50, which in the preferred embodiment is comprised by u-shaped channel 67 and hand screw 68. This arrangement permits clamp 60 to be pivoted with respect to telescopic arm 50, but owing to the short distance from pivotal axis formed by hand screw 68, requires significant bending moment to effect relative movement therebetween.

Figure 5:
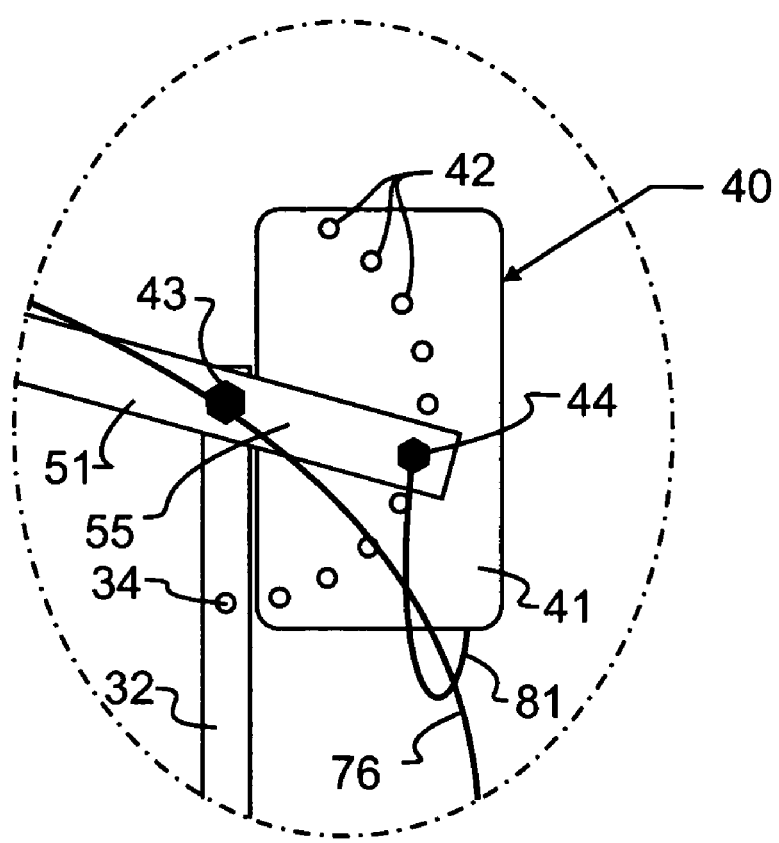
FIG. 5 illustrates the preferred telescopic arm pivot illustrated in FIG. 1 by magnified section view taken along line 5' of FIG. 1.
Figure 6:
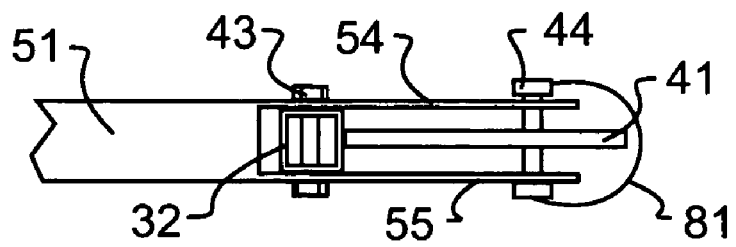
FIG. 6 illustrates the preferred light clamp telescopic arm pivot of FIG. 5 from top plan view.

FIGS. 5 and 6 illustrate pivotal joint 40, which is used to couple telescopically extensible arm 50 to standard 30. Plate 41 is preferably rigidly affixed to extensible tube 32 such as by welding or other suitable means. Through plate 41 are provided a plurality of holes 42 that in the preferred embodiment follow an arc having a focal point or center of radius at pivot 43. Through one of holes 42 may extend a position setting pin 44 which simultaneously passes through openings in spaced members 54, 55 which extend from outer tube 51. Spaced members 54, 55, which may be formed by bifurcating outer tube 51, form a yoke which surrounds plate 41. This pivotal joint 40 provides positive locking of angular relationship between standard 30 and telescopic arm 50, regardless of the amount of torque applied therebetween, while providing a large number of possible angular relationships through the plurality of holes 42. When proportioned most optimally in accord with the preferred embodiment, holes 42 will be sufficiently closely spaced that any further movement or positioning that may be required and not provided for through these holes will be readily compensated for by motion at hand screw 68 between telescopic arm 50 and clamp 60. An additional hole 34 is preferably included in extensible tube 32, which permits position setting pin 44 to pass there through while passing through spaced members 54, 55, thereby locating telescopic arm co-axially with extensible tube 32 and consequently co-axially with standard 30 generally. Pivotal joint 40 will therefore permit telescopic arm 50 in this preferred embodiment to be pivoted from vertical and extending upward from pivot 43 when setting pin 44 passes through hole 34 to nearly vertical again, though this time extending downward relative to pivot 43 when setting pin 44 passes through hole 42 most distal to hole 34. This wide range of motion permits light source 70 to be positioned from adjacent a ground level near base 20 through any elevation up to substantially above pivot 43. While this combination of holes 42 and setting pin 44 is most preferred and believed to offer independent novelty owing to the relative simplicity of construction and use and the inherent rigidity and strength, other alternative methods of setting the preferred angular relationship may be utilized that may be known in the art of pivotal couplings, and such will be understood to be incorporated herein as well. Furthermore, the arrangement of pivotal joint 40 outlined herein above which describes and illustrates attachment of plate 41 to extensible tube 32 is optional, and it will be understood that pivotal joint 40 may be reversed. If reversed from the preferred embodiment, plate 41 will be attached to telescopic arm outer tube 51, and spaced members 54, 55 will be affixed to or formed from extensible tube 32 rather than from telescopic arm outer tube 51.

Electric cord support 81 in the preferred embodiment is provided as a part of the structure of positing setting pin 44, though it will be recognized that other suitable cord locating means may be provided as known in the art of electrical appliances. A cord wind is similarly provided through a combination of protruding tabs 82, 83, and a final guide may be provided in the form of cord ring 84. Other features such as parts trays, auxiliary outlets, and other such fixtures or components may similarly be provided upon preferred embodiment stand-supported light source 10.

As may be recognized, the preferred embodiment stand-supported light source 10 may be manufactured relatively independent of materials. By that, it will be understood that many diverse materials may be used in the fabrication. Nevertheless, it will also be recognized that preferred embodiment stand-supported light source 10 may be manufactured entirely from steel, which as aforementioned offers advantage in environments where alternative materials such as polymers might be adversely affected by solvents, mechanically damaging forces, or other factors rending polymeric materials unsuitable or undesirable.

While the foregoing details what is felt to be the preferred embodiment of the invention, no material limitations to the scope of the claimed invention are intended. Further, features and design alternatives that would be obvious to one of ordinary skill in the art are considered to be incorporated herein. For exemplary purposes only, and not limiting thereto, it will be appreciated that while the figures illustrate only two sections for telescopically extensible vertical standard 30 and telescopically extensible arm 50, three or more telescoping sections may be provided as desired, or for some applications no telescoping may be provided. Consequently, the scope of the invention is set forth and particularly described in the claims herein below.

We claim:

1. An extensible and collapsible stand in combination with and supporting a light source, comprising:
    a base providing mechanical support upon a surface;
    a column rising from said collapsible base;
    a boom arm;
    a pivotal joint coupling said column to said boom arm;
    a light source having a handle, light bulb, and electrical cord, wherein said light source handle further comprises a means to manually control the flow of electric power to an electrical device and said top and bottom member edges are separated by a gap which varies and which is greatest adjacent to said electric power flow control means to permit manual access to said electric power flow control, and which distal therefrom is insufficient to permit said manual access; and
    a clamp coupling said light source to said boom arm having top and bottom members of a generally u-shaped cross-section operatively drawn together by a force applicator about said light source handle and additionally having a means for attachment to said boom arm.

2. The combination extensible and collapsible stand and light source of claim 1, wherein said means to manually control the flow of electric power to an electrical device is selected from the group comprising an electrical switch and an electrical power outlet.

3. The combination extensible and collapsible stand and light source of claim 1, wherein said force applicator further comprises spaced plates and screws operative to force said plates together.

4. The combination extensible and collapsible stand and light source of claim 3, wherein said plates are affixed to said top and bottom members to prevent said top and bottom members from operatively separating from said plates when said light source has been removed from said clamp.

5. The combination extensible and collapsible stand and light source of claim 4, wherein said screws are hand screws.

6. The combination extensible and collapsible stand and light source of claim 1, wherein said column further comprises:
    a first longitudinally extensive column member and at least one extensible column member extensible with respect to said first longitudinally extensive column member and co-axial therewith to define a longitudinal axis of said column, and a means to secure said at least one extensible column member in position relative to said first longitudinally extensive column member;
    and wherein said boom arm further comprises:
    a first longitudinally extensive member and a second member extensible with respect to said first member, and a fastener controllably fixing a relative position between said first longitudinally extensive member and said second member.

7. A clamp affixing a light source to a supporting stand, comprising top and bottom members of a generally u-shaped cross-section operatively forced together by a force applicator about said light source handle and additionally having a means for attachment to said boom arm, wherein said top and bottom members extend longitudinally parallel to a longitudinal extension of said light source handle and further define a minimum gap therebetween at each longitudinal cross-section, said minimum gap which is smallest in a region longitudinally central to said top and bottom members.

8. The clamp of claim 7 wherein said force applicator further comprises a pair of spaced-apart plates and screws forcing said pair of spaced-apart plates together.

9. The clamp of claim 8 wherein said plates are affixed to said top and bottom members to prevent said top and bottom members from separating from a remainder of said clamp when said force applicator is not applying a force.

10. An adjustable trouble light stand for supporting an illumination source above a surface and at various locations relative to a work piece resting upon said surface, comprising:
   a collapsible base having at least three fixed u-shaped brackets, each which are closed from the top and both sides but open from the bottom most nearly adjacent said surface, at least three legs arranged with each one of said at least three legs extending from and pivotally attached to a corresponding one of said at least three fixed u-shaped brackets to permit movement of ends of said legs distal to said brackets, and surface contacting pads pivotally attached and terminating each of said legs adjacent said ends of said legs distal to said brackets, said ends of said legs pivotal away from said surface to a degree limited by mechanical interference between said legs and said closed tops of said brackets;
   a telescopically extensible vertical standard rising from said collapsible base having a first longitudinally extensive standard member and a second extensible standard member extensible with respect to said first longitudinally extensive standard member and co-axial therewith to define a longitudinal axis of said telescopically extensible vertical standard, and a fastener controllably fixing said second extensible standard member to said first longitudinally extensive standard member;
   a telescopically extensible arm having a first longitudinally extensive member and a second member extensible with respect to said first member, and a hand fastener controllably fixing a relative position between said first longitudinally extensive member and said second member;
   a pivotal joint coupling said telescopically extensible vertical standard to said telescopically extensible arm and having a plate rigidly affixed to said longitudinally extensive member with a plurality of holes that follow an arc having a center of radius at a pivot between said telescopically extensible vertical standard and said telescopically extensible arm, a position setting pin suitable for extending through at least one of said plurality of holes and simultaneously passing through openings in a pair of spaced members which extend from said arm first longitudinally extensive member;
   a hole in second extensible standard member which follows said arc and said permits position setting pin to pass there through while passing through said openings in said pair of spaced members, thereby locating said telescopically extensible arm co-axially with said second extensible standard member;
   a light source having a handle, electric power switch, light bulb, and electrical cord;
   a clamp coupling said light source to said telescopically extensible arm having top and bottom clamshell members of a generally u-shaped cross-section forced together by a pair of hand screws, said top and bottom clamshell members open in middle portions most adjacent to said pair of hand screws and providing manual access to said electric power switch, said top and bottom clamshell members operatively clamped together about said light source handle by forces generated by said hand screws.

11. The adjustable trouble light stand of claim 10 further comprising an electric cord support unitary with said positing setting pin.

12. The adjustable trouble light stand of claim 10 further comprising a cord wind integrally attached to said telescopically extensible vertical standard.

13. The adjustable trouble light stand of claim 12 further comprising a cord guide ring integrally attached to said telescopically extensible vertical standard.

14. An extensible and collapsible stand in combination with and supporting a light source, comprising:
   a base providing mechanical support upon a surface;
   a column rising from said collapsible base;
   a boom arm;
   a pivotal joint coupling said column to said boom arm, wherein said pivotal joint further comprises a plate with a plurality of holes, a position setting pin suitable for extending through at least one of said plurality of holes and simultaneously passes through openings in a pair of spaced members;
   a light source having a handle, light bulb, and electrical cord; and
   a clamp coupling said light source to said boom arm having top and bottom members of a generally u-shaped cross-section operatively drawn together by a force applicator about said light source handle and additionally having a means for attachment to said boom arm.

15. The combination extensible and collapsible stand and light source of claim 14, wherein said plurality of holes follow an arc having a center of radius at a point of pivot between said column and said boom arm.

16. The combination extensible and collapsible stand and light source of claim 15, wherein said plate is rigidly affixed to said column and said pair of spaced members extend from said boom arm.

17. The combination extensible and collapsible stand and light source of claim 16, further comprising a hole in said column and contiguous with said arc of holes.

* * * * *